US008943226B1

(12) United States Patent
Hoglund et al.

(10) Patent No.: US 8,943,226 B1
(45) Date of Patent: Jan. 27, 2015

(54) INTERFACE FOR HETEROGENEOUS PCI-E STORAGE DEVICES (71) Applicant: LSI Corporation, San Jose, CA (US)

(72) Inventors: Timothy E. Hoglund, Colorado Springs, CO (US); Gary J. Piccirillo, Houston, TX (US); James K. Yu, Houston, TX (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 14/136,289

(22) Filed: Dec. 20, 2013

Related U.S. Application Data (60) Provisional application No. 61/907,571, filed on Nov. 22, 2013.

(51) Int. Cl.
G06F 3/00 (2006.01)
G06F 3/06 (2006.01)
G06F 11/20 (2006.01)

(52) U.S. Cl.
CPC ............ G06F 3/0659 (2013.01); G06F 3/0604 (2013.01); G06F 3/0688 (2013.01); G06F 11/2094 (2013.01); G06F 2003/0697 (2013.01)
USPC ...... 710/5; 710/8; 710/11; 710/300; 710/301; 710/302; 711/114

(58) Field of Classification Search
None
See application file for complete search history.

(56) References Cited

U.S. PATENT DOCUMENTS 6,098,114 A * 8/2000 McDonald et al. ................ 710/5
6,266,731 B1 * 7/2001 Riley et al. ..................... 710/313
6,301,625 B1 * 10/2001 McDonald et al. ............... 710/5
6,421,760 B1 * 7/2002 McDonald et al. ........... 711/114
6,549,981 B2 * 4/2003 McDonald et al. ........... 711/114
7,167,929 B2 * 1/2007 Steinmetz et al. ................ 710/5
7,219,175 B1 * 5/2007 Davis et al. .................... 710/105
7,801,120 B2 * 9/2010 Steinmetz et al. ............ 370/360
8,281,084 B2 * 10/2012 Steinmetz et al. ............ 711/154
8,289,984 B2 * 10/2012 Sebastian et al. ............. 370/412
8,321,650 B2 * 11/2012 Steinmetz et al. ............ 711/171
8,443,114 B2 * 5/2013 Lambert et al. ................. 710/13
8,521,934 B1 * 8/2013 Ni ................................. 710/113
8,738,817 B2 * 5/2014 Lambert et al. ................. 710/13

(Continued)

OTHER PUBLICATIONS

'PCI' from OSDev Wiki archived from May 12, 2013.*

(Continued)

*Primary Examiner* — Steven Snyder
(74) *Attorney, Agent, or Firm* — Duft Bornsen & Fettig LLP (57) ABSTRACT

Disclosed is a storage device interface. The storage device interface includes a plurality of PCIe device request engines. These PCIe device request engines receive I/O commands formatted for a respective one of a plurality of PCIe storage device communication standards. The storage device interface also includes a plurality of PCIe device completion engines. These PCIe device completion engines receive notifications of command completions from a plurality of PCIe storage devices that communicate using the aforementioned plurality of PCIe storage device communication standards. These notifications are validated. If an error is detected, processing of notifications of command completions associated with that device are blocked until the error is resolved. The plurality of PCIe device request engines and the PCIe device completion engines operate concurrently to process received I/O commands and received command completions.

18 Claims, 6 Drawing Sheets

(56) References Cited

U.S. PATENT DOCUMENTS

| | | | |
|---|---|---|---|
| 2002/0073258 A1* | 6/2002 | Riley et al. | 710/105 |
| 2003/0120865 A1* | 6/2003 | McDonald et al. | 711/114 |
| 2005/0182881 A1* | 8/2005 | Chou et al. | 710/301 |
| 2006/0136666 A1* | 6/2006 | Pang et al. | 711/114 |
| 2006/0161707 A1* | 7/2006 | Davies et al. | 710/268 |
| 2006/0230218 A1* | 10/2006 | Warren et al. | 710/315 |
| 2008/0005470 A1* | 1/2008 | Davies | 711/114 |
| 2008/0016275 A1* | 1/2008 | Sebastian et al. | 711/114 |
| 2011/0185103 A1* | 7/2011 | Evoy et al. | 710/313 |
| 2012/0151097 A1* | 6/2012 | Lambert et al. | 710/13 |
| 2013/0086311 A1* | 4/2013 | Huang et al. | 711/103 |
| 2013/0232301 A1* | 9/2013 | Lambert et al. | 711/114 |
| 2014/0173017 A1* | 6/2014 | Takagi et al. | 709/213 |

OTHER PUBLICATIONS

Livny, Isaac, Storage over PCI Express Traffic Analysis and Generation Techniques, LeCroy Corporation, PCI-SIG, 2012.

* cited by examiner

INTERFACE FOR HETEROGENEOUS PCI-E STORAGE DEVICES

BACKGROUND

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY

An embodiment of the invention may therefore comprise a storage device interface. The storage device interface includes a plurality of PCIe device request engines. These PCIe device request engines receive I/O commands formatted for a respective one of a plurality of PCIe storage device communication standards. The storage device interface also includes a plurality of PCIe device completion engines. These PCIe device completion engines receive notifications of command completions from a plurality of PCIe storage devices that communicate using the aforementioned plurality of PCIe storage device communication standards. The plurality of PCIe device request engines and the PCIe device completion engines operate concurrently to process received I/O commands and received command completions.

An embodiment of the invention may therefore further comprise a method of providing communication to a plurality of PCIe storage devices that operate using a plurality of PCIe storage device communication standards. This method includes receiving, at a plurality of PCIe device request engines, I/O commands that have been formatted for a respective one of said plurality of PCIe storage device communication standards. At a plurality of PCIe device completion engines, notifications of corresponding command completions are received. These notifications are received from a plurality of PCIe storage devices that communicate using the plurality of PCIe storage device communication standards. The plurality of PCIe device request engines and the PCIe device completion engines operate concurrently to process received I/O commands and received command completions.

DETAILED DESCRIPTION OF THE EMBODIMENTS

Figure 1:
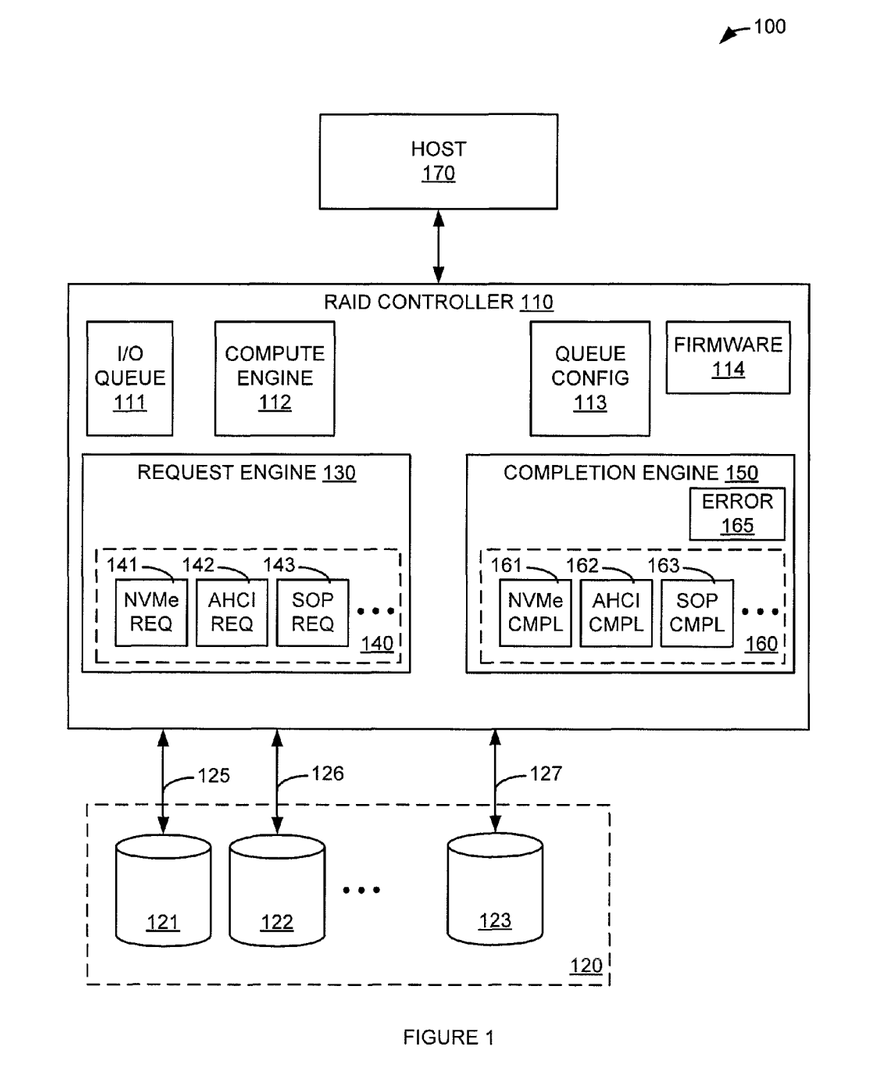
FIG. 1 is a block diagram of a storage system.

FIG. 1 is a block diagram of a storage system. In FIG. 1, storage system 100 comprises RAID controller 110, attached storage devices 120, and host 170. Attached storage devices 120 include storage device 121, storage device 122, and storage device 123. Attached storage devices 120 may also include more storage devices. However, these are omitted from FIG. 1 for the sake of brevity. Host 170 is operatively coupled to RAID controller 110. Storage device 121 is operatively coupled to RAID controller 110 by PCI-Express (PCIe) link 125. Storage device 122 is operatively coupled to RAID controller 110 by PCIe link 126. Storage device 123 is operatively coupled to RAID controller 110 by PCIe link 127.

RAID controller 110 includes I/O queue 111, compute engine 112, queue config 113, firmware 114 request engine 130, and completion engine 150. Request engine 130 includes device communication standard request engines 140. Device communication standard request engines 140 include NVM Express (NVMe) request engine 141, Advanced Host Controller Interface (AHCI) request engine 142, and SCSI over PCIe (SOP) request engine 143. Request engine 130 may include additional request engines for the same or other PCIe storage device communication standards. However, these have been omitted from FIG. 1 for the sake of brevity.

Completion engine 150 includes device completion engines 160 and error handler 165. Device completion engines 160 include NVMe completion engine 161, AHCI completion engine 162, and SOP completion engine 163. Completion engine 160 may include additional completion engines for the same or other PCIe storage device communication standards. However, these have been omitted from FIG. 1 for the sake of brevity.

Attached storage devices 120, and storage devices 121-123 are operatively coupled to RAID controller 110. Thus, RAID controller 110 may operate to control, span, and/or stripe attached storage devices 120 to provide RAID functionality. RAID controller 110 may project virtual volumes to host 170. Once created from the RAID configurations, virtual volumes may be accessed by host computer 170.

In an embodiment, storage devices 120 may communicate with RAID controller 110 using various PCIe storage device communication standards. For example, storage device 121 may communicate with RAID controller 110 using NVMe commands, procedures, protocols, formats, and/or datagrams. Storage device 122 may communicate with RAID controller 110 using AHCI commands, procedures, protocols, formats, and/or datagrams. Storage device 123 may communicate with RAID controller 110 using SOP commands, procedures, protocols, formats, and/or datagrams.

RAID controller 110 allows full flexibility in the PCIe storage devices (e.g., hard drives and/or Solid-state disks) that can be used for storage devices 120. RAID controller 110 also allows a mix of storage devices 120 that have incorporated different standards (e.g., NVMe, AHCI, SOP) to operate concurrently with each other. RAID controller 110 sets up communication individually per storage device 120, thus allowing any standards to be chosen for each storage device 120. RAID controller 110 also allows RAID controller 110 hardware to handle the completions from all types of PCIe hard drives. For the standards supported by RAID controller 110, none of the completions are required to be sent to firmware for processing due to a standard not being supported. In addition, when a completion with an error is encountered, completion processing for that storage device 120 will stop, but completion processing for the other storage devices 120 is allowed to continue. Only the storage device 120 with the error is affected. By having a method for hardware to handle completions for all standards supported by RAID controller 110, and not stalling all completion processing when an error is encountered, higher performance can be achieved.

RAID controller 110 provides flexibility in the PCIe storage devices 120 that can be used and also allows a mix of storage devices 120 that have incorporated different standards to operate concurrently with each other. In an embodiment, this is accomplished using separate request engines (e.g., NVMe request engine 141, AHCI request engine 142, and SOP request engine 143) and corresponding completion engines (e.g., NVMe completion engine 161, AHCI completion engine 162, and SOP completion engine 163.) Each request engine 140 and completion engine 160 pair follows the protocol required for the particular standard that it implements and communicates with all devices associated with that respective standard. In addition, request engine 140 and completion engine 160 pairs can operate in parallel with each other. This allows all implemented standards to be supported simultaneously.

When RAID controller 110 encounters a completion with an error, completion processing for that storage device 120 is stopped, but completion processing for the other storage devices 120 continues. In an embodiment, when an completion with an error occurs, further completion processing for the storage device 120 that reported the error will be masked off until the error condition is handled by firmware 114. Completion processing for other storage devices 120 continues and is not affected by an error on another storage device 120.

RAID controller 110 includes Queue config 113. Queue config 113 includes a configuration structures for each storage device 120 that are attached to RAID controller 110. Upon boot up of the system, firmware 114 determines the type of storage device 120 that is attached and stores appropriate information in the queue config 113 structure associated with that device. Included in the information stored in the queue config 113 structure for a particular storage device 120 is what standard the storage device 120 is using. This information is used for routing requests and completions to the appropriate request engine 140 and/or completion engine 160.

In an embodiment, when RAID controller 110 receives a request (e.g., from host 170) that a new I/O message needs to be processed, the message is prefetched and placed into I/O queue 111. As long as there is room in I/O queue 111, additional messages can be fetched. Valid entries in the Queue are sent to a compute engine 112. Compute engine 112 can be a sequencer or processor. Using information from queue config 113 (such as Response ID, Page Size, Block Size, etc), the compute engine 112 modifies the message to place it into an appropriate command format for the intended storage device 120. In other words, the message is formatted as required for a respective AHCI, NVMe or SOP device. Queue config 113 maintains a separate configuration structure for each individual storage device 120. These configuration structures are indexed by a Device ID received in the message. Upon completion of formatting, the formatted command is placed into a FIFO (not shown in FIG. 1). In an embodiment, the formatted command is placed into the FIFO provided there is space available in the FIFO.

Based on Device Type information from queue config 113, a request is sent to a corresponding one of NVMe request engine 141, AHCI request engine 142, or SOP request engine 143 to process the command at the top of the FIFO. Once a command has been removed from the FIFO by a request engine 140, a request for the next command in the FIFO to be processed will be issued. This next request may be issued to the same request engine 140 or a different request engine 140 depending on the Device Type information.

When a new request is received by a given request engine 140, the request engine 140 retrieves a command from the FIFO. Using address information stored in queue config 113 and a locally maintained index, the command is written to the device's command queue (not shown in FIG. 1). In addition, appropriate device command queue pointer(s) are updated to indicate a new command has been placed onto the device's command queue. All request engines 140 are capable of operating concurrently with each other.

In an embodiment, corresponding completion engines 160 operate in parallel with the request engines 140. For example, in FIG. 1 there are corresponding completion engines 160 for each of the three device types illustrated (i.e., NVMe, AHCI, SOP). Completion engines 160 operate concurrently with each other. When a storage device 120 is done executing a command, the storage device 120 posts a completion to its completion queue (not shown in FIG. 1) and issues a completion notification. Using the Device ID associated with the completion notification, and Device Type stored in queue config 113 structure, the completion notification is routed to the appropriate completion engine 160. The completion is then read using address information stored in queue config 113 and a locally maintained index. Validation of the completion is performed. If no error is detected, the completion is sent to host 170 or firmware 114 to notify them that the corresponding I/O command has been completed. The storage device 120's completion queue pointer(s) are updated to indicate that the completion has been removed from the completion queue. The completion engine 160 can continue to read and process completions for that storage device 120 until its associated completion queue is empty. In an embodiment, once all completions have been removed from the completion queue for a storage device 120, notifications from other storage devices 120 with the same Device Type are processed next.

In an embodiment, in some cases, to determine if an error occurred, an entry in a completion queue needs to be examined. In other cases, status registers indicate information about the completion. In both of these cases, there is some sort of data structure that needs to be retrieved and analyzed to determine if a valid completion occurred or if there was an error. Using address information in queue config 113, the appropriate structure will be retrieved and analyzed. If an error is detected, an interrupt is issued to firmware 114 to indicate an error needs to be handled. In addition, an internal error flag is set that blocks further completion notifications from that storage device 120. Completion processing for that storage device 120 is stopped until firmware has handled the error condition and cleared the internal error flag. After notifying firmware 114, notifications from other storage devices 120 with the same Device Type are processed next.

If no Error is encountered, the completion is sent to host 170 or firmware 114 to notify host 170 or firmware 114, respectively, that the I/O command has been completed. A completion engine 160 continues to read and process completions for the storage device 120 until all outstanding completions in the storage device 120's completion queue have been processed. Once all completions are processed for a given storage device 120, notifications from other storage devices 120 with the same Device Type are processed next.

In an embodiment, RAID controller 110 maintains an individual error flag per storage device 120. A storage device 120's error flag is set by error handler 165 when a completion error is detected. A storage device 120's error flag is cleared by cleared by firmware 114 once the error condition is handled. While an error flag is set, completion notifications from the storage device 120 that the set flag is associated with are masked. This prevents completion notifications from that storage device 120 from being seen by an arbiter (not shown in FIG. 1) that selects the next storage device 120 for which completions are processed. Completion notifications from other storage devices whose associated error flags are not set will are not blocked and are seen by the arbiter. Thus, just storage devices 120 devices with errors are not seen by the arbiter. Completion processing continues for all storage devices 120 that do not have their associated error flag set.

Figure 2:
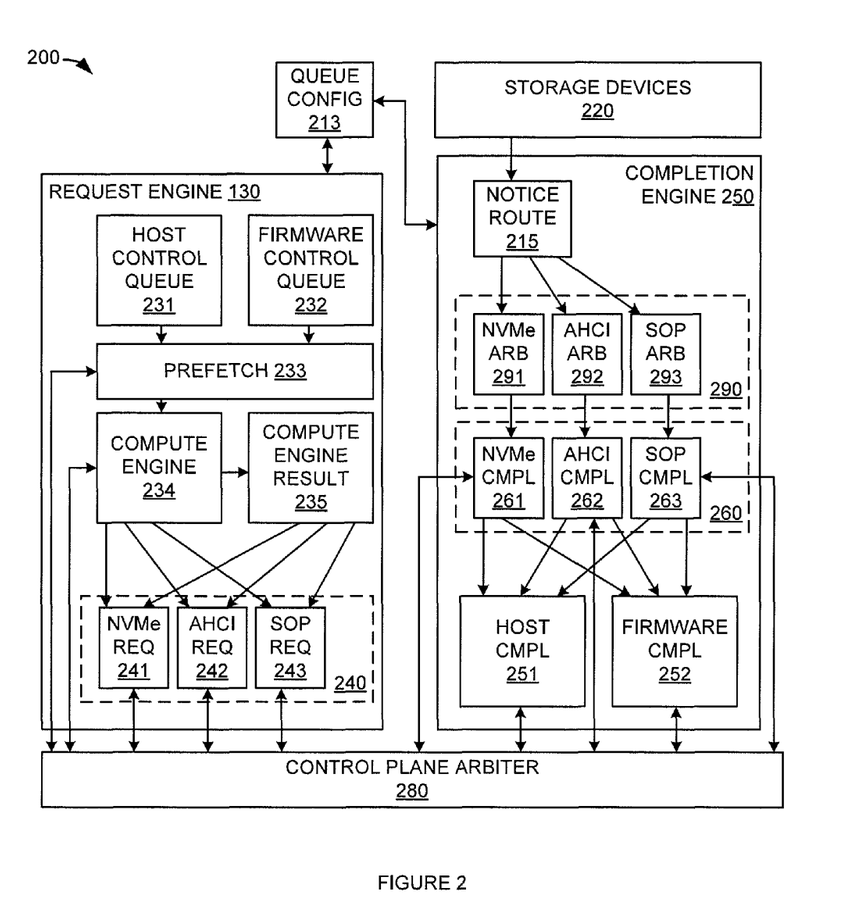
FIG. 2 is a block diagram illustrating a concurrent communication system.

FIG. 2 is a block diagram illustrating a concurrent communication system. In FIG. 2, concurrent communication system 200 comprises queue config 213, storage devices 220, request engine 230, completion engine 250, and control plane arbiter 280. Request engine 230 includes host control queue 231, firmware control queue 232, prefetch 233, compute engine 234, compute engine result buffer 235, and request engines 240. Request engines 240 include NVMe request engine 241, AHCI request engine 242, and SOP request engine 243. Completion engine 250 includes notification router 215, arbiters 290, completion engines 260, host completion 251, and firmware completion 252. Arbiters 290 include NVMe arbiter 291, AHCI arbiter 292, and SOP arbiter 293. Completion engines 260 include NVMe completion engine 261, AHCI completion engine 262, and SOP completion engine 263.

Host control queue 231 receives request messages from a host that are to be processed. Firmware control queue 232 receives request messages from firmware that are to be processed. Each control queue entry contains an index to where the message is located and an index for which storage device 220 the request is to be sent to. The prefetch engine 233 arbitrates between host control queue 231 and firmware queue 232. Using the message index from the selected queue, prefetch engine 233 fetches the message from memory and places it into a prefetch buffer. This continues as long as there is space available in the prefetch buffer. Once there is a message in the prefetch buffer, a request along with a device index from the selected control queue is sent to compute engine 234.

Compute engine 234 is a programmable sequencer that is setup after power up to process the various messages it will receive. When a request is received by compute engine 234, it will retrieve the message from the prefetch buffer. In addition, compute engine 234 uses the device index to retrieve information from queue config 213 that is needed for the message to be processed. Queue config 213 is a set of configuration registers that allows a different setup for each device. There is an individual structure in queue config 213 for each of storage devices 220. In an embodiment, there are 32 devices that are supported. The number of structures in queue config 213 can be decreased or increased depending on how many total storage devices 220 are supported by communication system 200. A field from queue config 213 that compute engine 234 uses is the Device Type. The Device Type indicates whether the message is intended for an AHCI, NVMe or SOP type storage device 220. Compute engine 234 uses this and other information from queue config 213 (such as Block Size, Page Size, Response ID, etc.) fields to place the message into the proper command format of the intended storage device 220. The formatted command is placed into compute engine result buffer 235. While there are new message(s) in the prefetch buffer, and there is space in compute engine result buffer 235, compute engine 234 continues to process messages and create new command structures.

When there is a valid command in compute engine result buffer 235, a request is sent to one of the three request engines 240—NVMe request engine 241, AHCI request engine 242, or SOP request engine 243. The Device Type field from queue config 213 indicates which request engine 240 the request needs to be routed to. The request engine 240 selected will retrieve the command from the compute engine result buffer 235. Using the device index associated with a command, address fields and other information are retrieved from queue config 213 by the selected request engine 240. Addresses can indicate the storage device 220's command queue location, Command queue pointer location, and/or any status register(s) that may need updating. Using an address from queue config 213 and a locally maintained command index, a request engine 240 can write the command to the storage device 220's command queue following a procedure associated with that device type. In addition, the storage device 220's command queue pointer and/or status register(s) are updated to indicate to storage device 220 that a new command has been placed onto its associated command queue. Once a command has been removed from compute engine result buffer 235, if there are other commands in compute engine result buffer 235, another request will be sent to one of the three request engines 240. Depending on the Device Type, the next request could be the same or different request engines 240 as the previous command. If the request engine 240 selected is not busy, the request engine 240 will start a procedure for sending that command to the device. All three of the request engines 240 are capable of running concurrently.

Once a PCIe storage device 220 has completed a command it has received, a notification will be issued indicating there are completions available for processing. Using the device index associated with the notification, and the Device Type from queue config 213, notice router 215 will route the notification to one of three arbiters 290. Each arbiter 290 operates in parallel with each other arbiter and is associated with a particular completion engine 260 (e.g., NVMe completion engine 261, AHCI completion engine 262, or SOP completion engine 263). Each completion engine 260 also operates in parallel with each other completion engine 260. A given arbiter 290 will handle notifications from all storage device 220 that are of the corresponding Device Type.

A notification from one of storage devices 220 is selected and a request will be issued to the selected completion engine 260. This request starts completion processing that follows the procedure associated with the Device Type of the selected completion engine 260. The device index will be used to retrieve address fields and other information from queue config 213. This information/addresses indicates the storage device 220's completion queue location, completion queue pointer location, and any status register(s) that may need to be updated and/or read. In some cases, the completion will be retrieved from the devices completion queue using an address from queue config 213 and a locally maintained completion index.

Validation of the completion is performed. The storage device 220's completion queue pointer is updated to indicate to storage device 220 that a completion has been removed from the completion queue. In other cases, a storage device 220's status register may be read (using an address from queue config 213) to indicate what I/O has been completed. The received status may be validated to check that the command for that I/O was actually sent to the storage device 220.

Once the processing of a completion is finished, a completion will be sent to host completion 251 or firmware completion 252 in order to notify to a respective one of host completion 251 or firmware completion 252 that an I/O issued by a host or firmware has completed. The completion engine 260 checks if there are any other completions for that storage device 220 that needs processing and, if appropriate, repeat the required procedure. This continues until all completions have been processed. Any status register(s) that need to be updated will then be written to using addresses from queue config 213. Following this, an indication will be sent back to an arbiter 290 that all outstanding completions have been handled for this storage device 220. Arbitration occurs again and another storage device 220 with outstanding completions that is associated with the selected completion engine 260 is selected.

Figure 3:
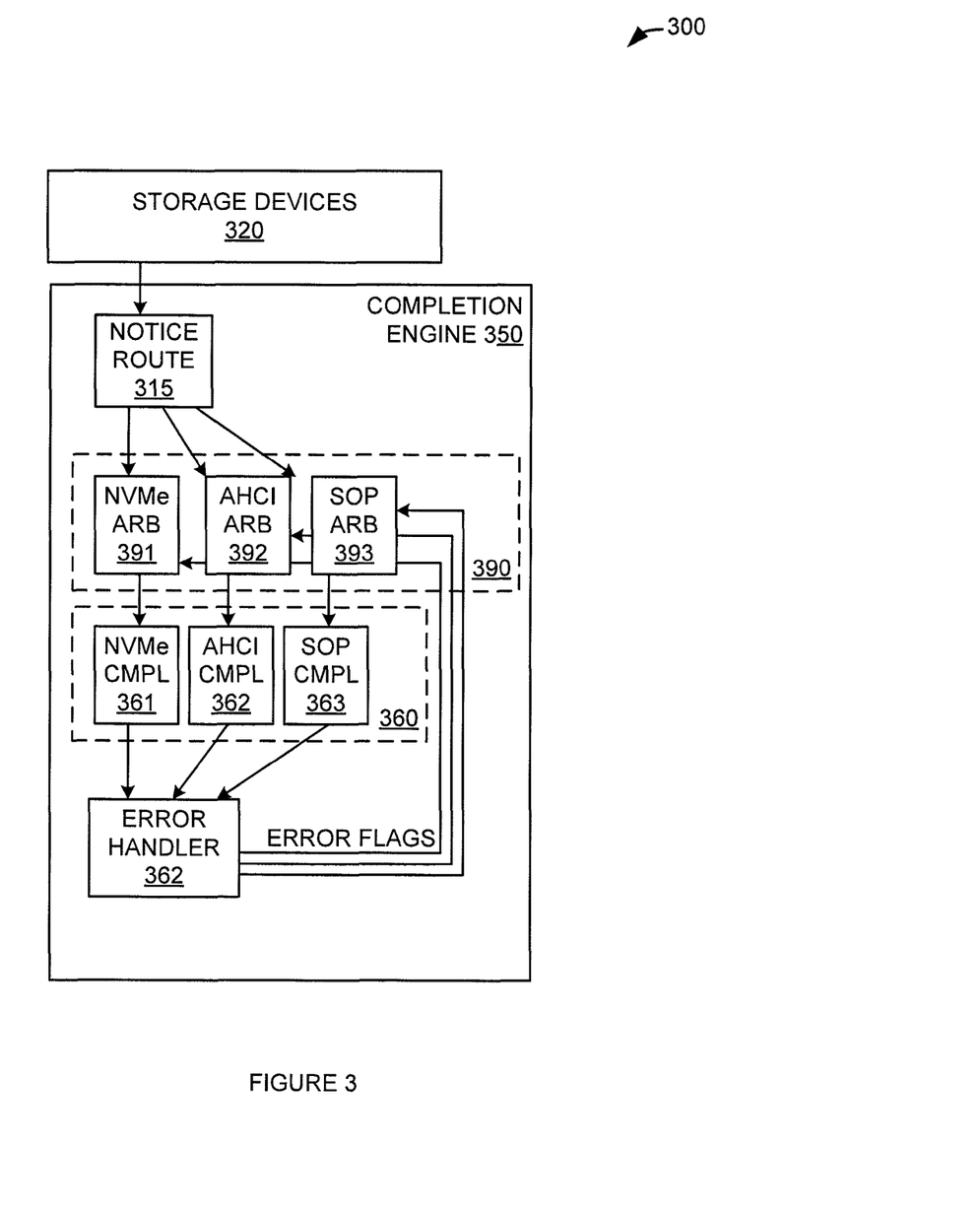
FIG. 3 is a block diagram illustrating a completion error handling system.

FIG. 3 is a block diagram illustrating a completion error handling system. In FIG. 3, completion error handling system 300 comprises PCIe storage devices 320 and completion engine 350. Completion engine 350 includes completion notice router 315, arbiters 390, completion engines 360 and error handler 362. Arbiters 390 include NVMe arbiter 391, AHCI arbiter 392, and SOP arbiter 393. Completion engines 360 include NVMe completion engine 361, AHCI completion engine 362, and SOP completion engine 363.

Each arbiter 390 operates in parallel with each other arbiter 390 and is associated with a particular completion engine 360 (e.g., NVMe completion engine 361, AHCI completion engine 362, and SOP completion engine 363.). Each completion engine 360 also operates in parallel with each other completion engine 360. A given arbiter 390 will handle notifications from all devices that are of that Device Type. In conjunction with each notification, there is an internally maintained error flag per PCIe storage device 320. When the flag is asserted, the flag will block notifications from the associated storage device 320 from being seen by the respective arbiter 390. Notifications from other storage devices 320 will still be seen by their associated arbiter 390.

For a given arbiter 390, a notification that is not blocked by an error flag is selected and a request is issued to the corresponding completion engine 360. This starts the completion processing which follows the procedure associated with the Device Type of that completion engine 360. A device index is used to retrieve address fields and other information from a queue config. These addresses will indicate the location of various structures associated with the completion that need to be examined. In some cases, an entry in a completion queue needs to be looked at. In other cases, status registers indicate information about the completion.

Once the structure is retrieved, various fields in the structure are validated. For some of those fields, the value is always the same. Those fields are compared against that constant value. Other fields may be different from completion to completion. In that case, a mask from queue config is used to indicate which bits of the field to not be included in the comparison. The remaining bits are examined to make sure they are an expected value. If all of the validation checks pass, the completion engine 360 checks if there are any other completions for that storage device 320 that need processing and, if appropriate, repeats the required procedure. It should be understood that when all of the validation checks pass, each completion is sent to a host or firmware completion queue (not shown in FIG. 3), as appropriate. This continues until all completions for that device have been processed. If a validation check fails for any of the processed completions, an error flag for that device is set. This blocks future completion notifications from the storage device 320 until the error flag is cleared. An interrupt is asserted to notify firmware that an error condition needs to be resolved. Following the processing of all completions for a storage device 320, or the interrupt being set, re-arbitration occurs. Another storage device 320 with outstanding completions associated with the selected completion engine is be selected. The procedure described above is then repeated.

While completions are being handled for other storage devices 320, firmware resolves the detected error condition. Once the detected error condition has been resolved, firmware clears the associated error flag thereby allowing notifications from the previously blocked storage device 320 to participate in arbitrations.

By using error flags, completion engine 350 only stops completion processing those storage devices 320 that have an unresolved error. Valid completions from other storage devices 320 can still be serviced while firmware is resolving the error. Completion processing is not stalled as the result of detected error.

Figure 4:
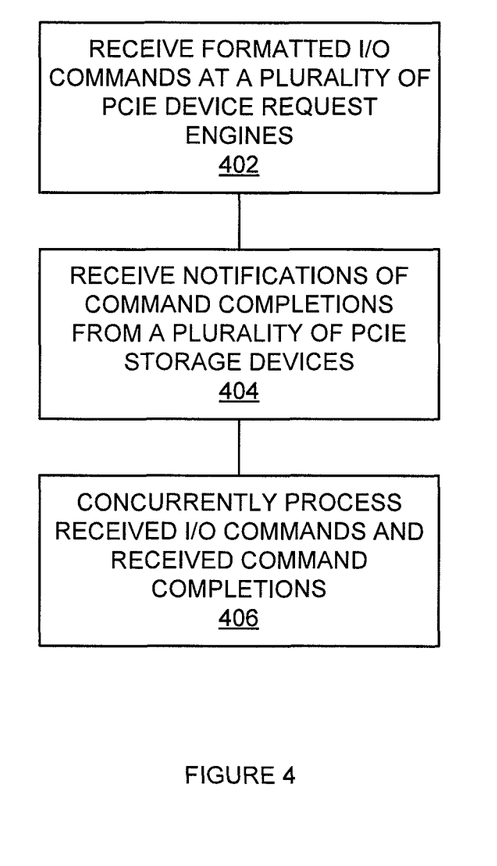
FIG. 4 is a flowchart of a method of operating a storage system interface.

FIG. 4 is a flowchart of a method of operating a storage system interface. The steps illustrated in FIG. 4 may be performed by one or more elements of storage system 100, concurrent communication system 200, and/or completion error handling system 300. Formatted I/O commands are received at a plurality of PCIe device request engines (402). For example, formatted I/O commands from compute engine 234 can be received by NVMe request engine 141, AHCI request engine 142, and SOP request engine 143. Notifications of command completions are received from plurality of storage devices (404). For example, notifications of command completions by storage devices 120 can be received by NVMe completion engine 161, AHCI completion engine 162, and SOP completion engine 163. Received I/O commands and received command completions are concurrently processed (406). For example, NVMe request engine 141, AHCI request engine 142, and SOP request engine 143 can work to process I/O commands at the same time that NVMe completion engine 161, AHCI completion engine 162, and SOP completion engine 163 are processing command completions.

Figure 5:
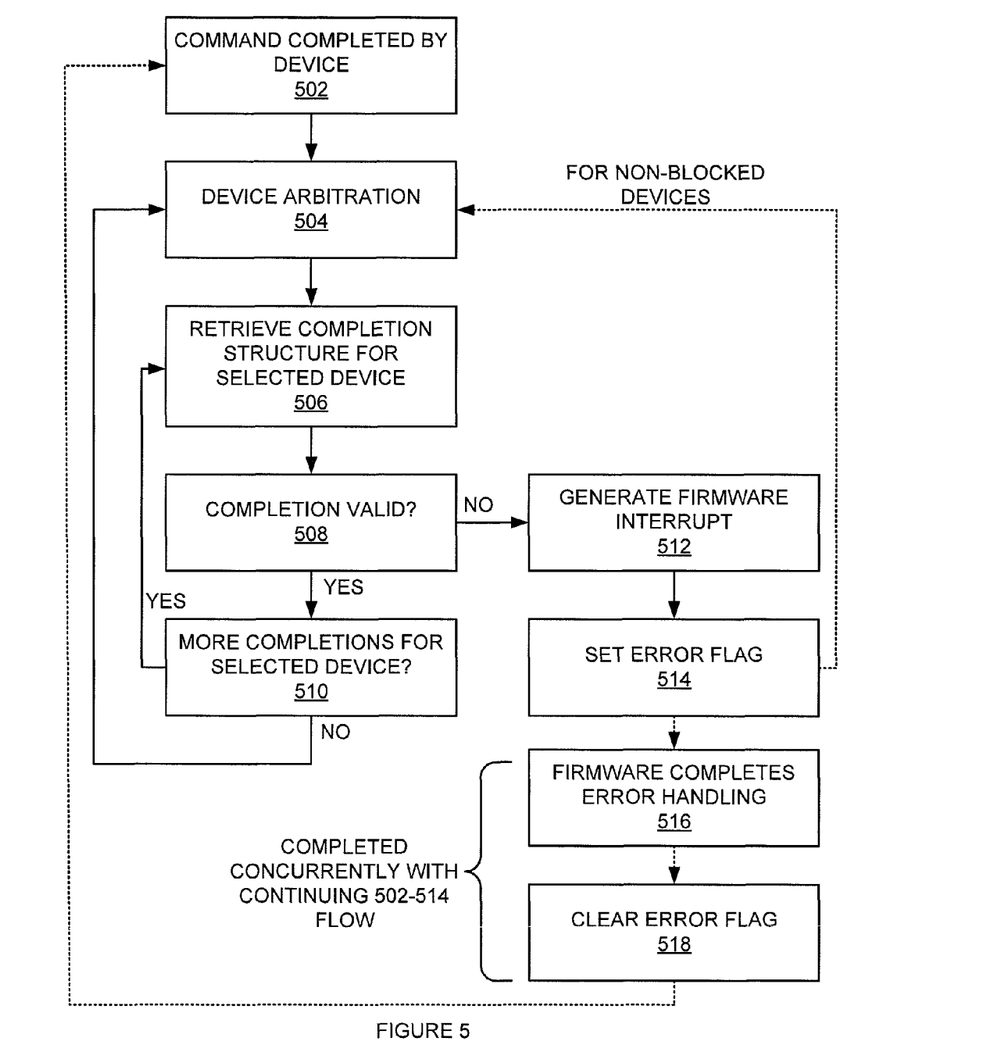
FIG. 5 is a flowchart of a method of handling completion errors.

FIG. 5 is a flowchart of a method of handling completion errors. The steps illustrated in FIG. 5 may be performed by one or more elements of storage system 100, concurrent communication system 200, and/or completion error handling system 300. A command is completed by a device (502). For example, a storage device 320 can complete an I/O command sent to it by a request engine (e.g., request engine 130.) Device arbitration is performed (504). For example, in response to a completion notification, arbiters 390 can perform arbitration. A completion structure is retrieved for a selected device (506). For example, a completion structure can be retrieved by a completion engine 360 for the device selected by arbiters 390.

In a step 508, the completion is checked for validity (508). If the completion is valid, flow proceeds to step 510. If the completion is not valid, flow proceeds to block 512. In a step

510, it is determined whether there are more completions for the selected device produced by block 502 (510). If there are more completions for the selected device, flow proceed to step 506. If there are no more completions for the selected device, flow proceeds to device arbitration step 504.

If a completion is not valid, a firmware interrupt is generated (512). If a completion is not valid, an error flag is set (514). This error flag prevents arbitration by a storage device until firmware resolves the error that resulted in the completion not being valid. Firmware then completes error handling (516). When firmware has completed error handling (i.e., resolved the error), the error flag is cleared (518). Concurrently with steps 516 and 518 being performed for the device that produced the error, flow proceeds back to block 504 device arbitration. In other words, only the device(s) that an error was detected for are blocked by the Error Flag. Completions from other devices are seen and processed by the flow described, above. For the device that produced the error, after the error flag is cleared, flow proceed back to block 502 so that as new completions from that device are completed (in 502) they will be arbitrated for (in 504).

The systems, software, devices, and functions described above may be implemented with or executed by one or more computer systems. The methods described above may be stored on a computer readable medium. one or more elements of storage system 100, concurrent communication system 200, and/or completion error handling system 300 may be, comprise, or include computers systems.

Figure 6:
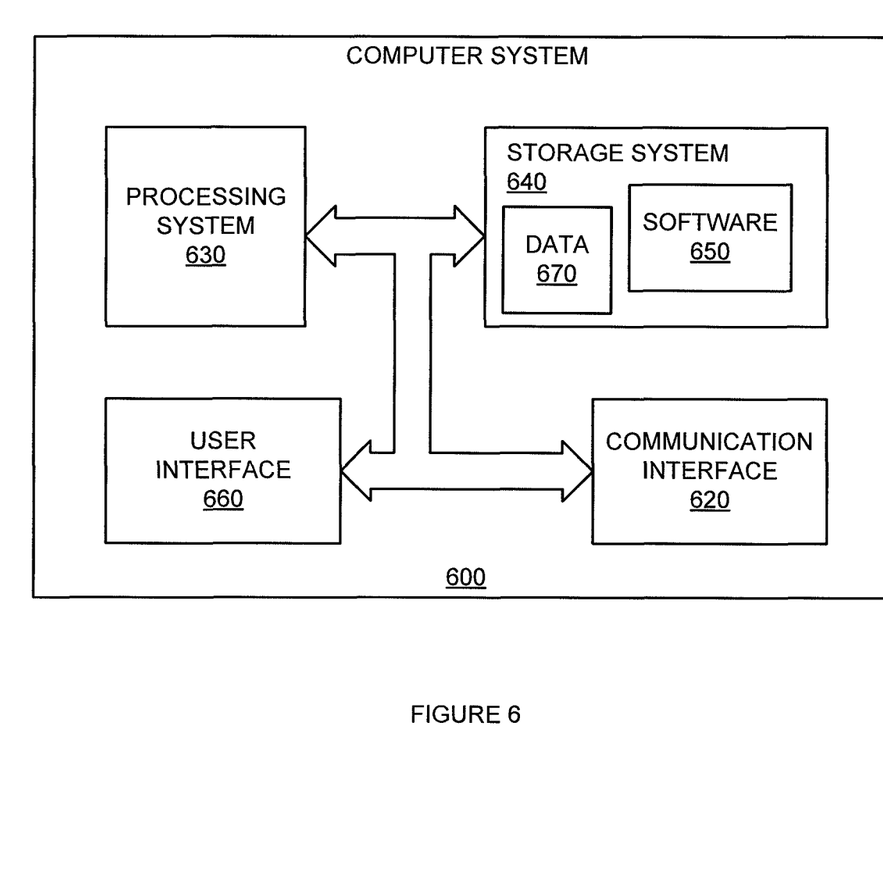
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system may retrieve and store data 670. Processing system may also retrieve and store data via communication interface 620. Processing system 650 may create or modify software 650 or data 670 to achieve a tangible result. Processing system may control communication interface 620 or user interface 670 to achieve a tangible result. Processing system may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage device interface, comprising:
   a plurality of Peripheral Component Interconnect Express (PCIe) device request engines to receive Input/Output (I/O) commands formatted for a respective one of a plurality of PCIe storage device communication standards;
   a plurality of PCIe device completion engines to receive notifications of command completions by a plurality of PCIe storage devices that communicate using said plurality of PCIe storage device communication standards, said plurality of PCIe device request engines and said PCIe device completion engines to operate concurrently to process received I/O commands and received command completions; and
   a queue configuration for each of said plurality of PCIe storage devices, wherein said queue configuration includes an indicator of a device type associated with each of said plurality of PCIe storage devices, wherein said indicator of said device type is used to determine a respective format of said I/O commands formatted for a respective one of a plurality of PCIe storage device communication standards, and wherein said indicator of said device type is used to select a one of said plurality of PCIe device request engines to transfer a corresponding I/O command to a corresponding one of said plurality of PCIe storage devices.

2. The storage device interface of claim 1, wherein said plurality of PCIe storage device communication standards includes Non-Volatile Memory Express (NVM Express).

3. The storage device interface of claim 1, wherein said plurality of PCIe storage device communication standards includes Advanced Host Controller Interface (AHCI).

4. The storage device interface of claim 1, wherein said plurality of PCIe storage device communication standards includes Small Computer System Interface (SCSI) over PCIe (SOP).

5. The storage device interface of claim 1, wherein said indicator of said device type is used to select which of said plurality of PCIe device completion engines is to receive a notification of a command completion.

6. A method of providing communication to a plurality of PCIe storage devices that operate using a plurality of Peripheral Component Interconnect Express (PCIe) storage device communication standards, comprising:

receiving Input/Output (I/O) commands formatted for a respective one of said plurality of PCIe storage device communication standards at a respective plurality of PCIe device request engines;

receiving, at a plurality of PCIe device completion engines, notifications of corresponding command completions by said plurality of PCIe storage devices that communicate using said plurality of PCIe storage device communication standards, said plurality of PCIe device request engines and said PCIe device completion engines operating concurrently to process received I/O commands and received command completions;

receiving, at an I/O message queue, an I/O message not formatted for one of said plurality of PCIe storage device communication standards, based on an indicator of a device type associated with each of said plurality of PCIe storage devices, selecting one of said plurality of PCIe device completion engines to receive a notification of a command completion.

7. The method of claim 6, wherein said plurality of PCIe storage device communication standards includes Non-Volatile Memory Express (NVM Express).

8. The method of claim 6, wherein said plurality of PCIe storage device communication standards includes Advanced Host Controller Interface (AHCI).

9. The method of claim 6, wherein said plurality of PCIe storage device communication standards includes Small Computer System Interface (SCSI) over PCIe (SOP).

10. The method of claim 6, further comprising:
based on said indicator of a device type associated with each of said plurality of PCIe storage devices, formatting said I/O message not formatted for one of said plurality of PCIe storage device communication standards into an I/O message compatible with one of said plurality of PCIe storage device communication standards.

11. The method of claim 10, wherein said indicator of said device type is used to select a one of said plurality of PCIe device request engines to transfer a corresponding I/O command to a corresponding one of said plurality of PCIe storage devices.

12. The method of claim 6, further comprising: validating said notifications of corresponding command completions.

13. The method of claim 12, further comprising:
detecting an error associated with a one of said corresponding command completions.

14. The method of claim 13, further comprising:
setting an error flag associated with a device associated with said error;
while said error flag is set, blocking said notifications of said corresponding command completions associated with said device from being processed; and,
while said error flag is set, processing said notifications of said corresponding command completions associated with other devices.

15. A Redundant Array of Independent Disks (RAID) storage controller operable to communicatively couple a host system to a plurality of Peripheral Component Interconnect Express (PCIe) storage devices, the storage controller comprising:
a compute engine operable to determine destinations for each of a plurality of Input/Output (I/O) messages by the host system, to select one of a plurality of PCIe protocols for each I/O message based on its determined destination, and to format each retrieved I/O message into an I/O request for one of the PCIe storage devices according to the PCIe protocol selected for the I/O message;
a request engine communicatively coupled to the compute engine and to each of the PCIe storage devices, wherein the request engine is operable to direct each I/O request to one of the PCIe storage devices according to its selected PCIe protocol; and
a completion engine communicatively coupled to each of the PCIe storage devices and to the host system, wherein the completion engine is operable to issue a completion notification to the host system in response to an I/O request of a first of the PCIe protocols by the request engine during an error for an I/O request of a second of the PCIe protocols by the request engine.

16. The storage controller of claim 15, further comprising:
an I/O queue communicatively coupled to the host system and to the compute engine to the queue I/O messages extracted from I/O commands by the host system.

17. The storage controller of claim 15, wherein:
The request engine is further operable to direct an I/O request to one of the PCIe storage devices according to its selected PCIe protocol during the error for the I/O request of the second PCIe protocol.

18. The storage controller of claim 15, wherein the PCIe protocols are selected from a group consisting of:
Non-Volatile Memory Express, Advanced Host Controller Interface; and Small Computer System Interface over PCIe.

* * * * *